US007221741B1

(12) United States Patent
Suder et al.

(10) Patent No.: US 7,221,741 B1
(45) Date of Patent: May 22, 2007

(54) DIALING USING CALLER ID

(75) Inventors: Eric G. Suder, Plano, TX (US); Harold E. A. Hansen, II, Plano, TX (US)

(73) Assignee: Estech Systems, Inc., Plano, TX (US)

( * ) Notice: Subject to any disclaimer, the term of this patent is extended or adjusted under 35 U.S.C. 154(b) by 0 days.

(21) Appl. No.: 09/484,732

(22) Filed: Jan. 18, 2000

Related U.S. Application Data

(60) Division of application No. 09/002,205, filed on Dec. 31, 1997, now Pat. No. 6,067,349, which is a continuation-in-part of application No. 08/873,215, filed on Jun. 11, 1997, now Pat. No. 6,252,944, which is a continuation-in-part of application No. 08/872,714, filed on Jun. 11, 1997, now Pat. No. 6,940,962.

(51) Int. Cl.
*H04M 1/64* (2006.01)

(52) U.S. Cl. ............................ 379/88.21; 379/142.01; 379/245; 455/415

(58) Field of Classification Search ............ 379/88.19, 379/88.21, 88.2, 142.01–142.17, 5, 90.01, 379/88.02, 207.15, 88.13, 215, 93.23
See application file for complete search history.

(56) References Cited

U.S. PATENT DOCUMENTS 4,930,152 A 5/1990 Miller ........................ 379/214
5,283,818 A 2/1994 Klausner et al. .............. 379/67
5,671,269 A 9/1997 Egan et al. ................... 379/88
5,717,741 A 2/1998 Yue et al. ..................... 379/67
5,734,706 A * 3/1998 Windsor et al. ....... 379/142.01
5,771,283 A * 6/1998 Chang et al. .......... 379/142.01
5,838,772 A * 11/1998 Wilson et al. ........... 379/88.19
5,852,655 A * 12/1998 McHale et al. .......... 379/93.14
5,862,210 A * 1/1999 Irie et al. ............... 379/215.01
5,894,504 A * 4/1999 Alfred et al. ............ 379/88.13
5,930,346 A * 7/1999 Chen ..................... 379/211.02
5,970,128 A * 10/1999 Kim ...................... 379/142.01
6,038,443 A * 3/2000 Luneau ....................... 455/415
6,088,430 A * 7/2000 McHale .................. 379/93.28
6,337,898 B1 * 1/2002 Gordon ..................... 379/67.1

* cited by examiner

*Primary Examiner*—Gerald Gauthier
(74) *Attorney, Agent, or Firm*—Kelly K. Kordzik; Fish and Richardson, P.C.

(57) ABSTRACT

A telephone and voice mail (voice processing) system, which is implemented using only a single processing means for controlling operation of both the telephone system and the voice mail system, permits a user to call back a party using caller ID data stored with a voice mail message left by the party calling into the system. This is accomplished by storing caller ID information associated with an incoming call along with the message placed by the incoming caller and stored within the mailbox associated with the called party. Additionally, the caller ID information may be used to create a speed dial list within the telephone and voice mail system for later use by the user. Such caller ID information may be retrieved from a voice mail message left by the calling party, or may be retrieved while conducting a conversation with the incoming call.

19 Claims, 14 Drawing Sheets

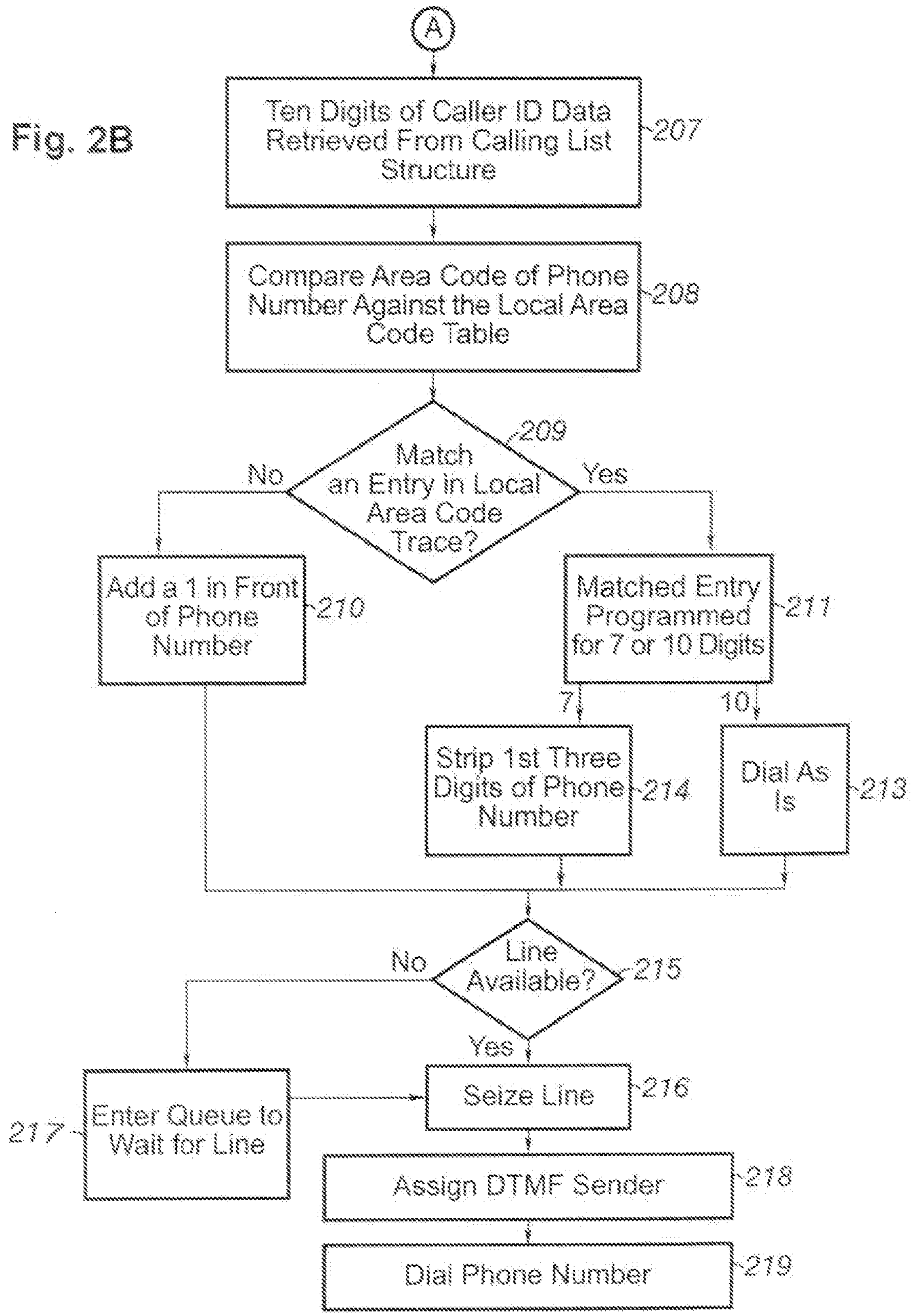

A
Fig. 2B
Ten Digits of Caller ID Data Retrieved From Calling List Structure
207
Compare Area Code of Phone Number Against the Local Area Code Table
208
Match an Entry in Local Area Code Trace?
209
No
Yes
Add a 1 in Front of Phone Number
210
Matched Entry Programmed for 7 or 10 Digits
211
7
10
Strip 1st Three Digits of Phone Number
214
Dial As Is
213
Line Available?
215
No
Yes
Enter Queue to Wait for Line
217
Seize Line
216
Assign DTMF Sender
218
Dial Phone Number
219

DIALING USING CALLER ID

This is a division of application Ser. No. 09/002,205 filed Dec. 31, 1997 now U.S. Pat. No. 6,067,349.

RELATED APPLICATIONS

The present application is a continuation-in-part application of U.S. patent application Ser. No. 08/873,215 filed Jun. 11, 1997 now U.S. Pat. No. 6,252,944 "Telephone Call/Voice Processing System" and U.S. patent application Ser. No. 08/872,714 filed Jun. 11, 1997 now U.S. Pat. No. 6,940,962 entitled "Dial On-Hold".

TECHNICAL FIELD

The present invention relates in general to telephone and voice processing systems, and in particular, to a telephone call/voice processing system that uses caller ID information for dialing out and creating calling lists.

BACKGROUND INFORMATION

Caller ID is a feature available over the public switched telephone network whereby an incoming call's telephone number is automatically made available to the called party. This feature has become very useful for both businesses and homes, enabling the receiver of an incoming call to know who is the calling party before answering the incoming call. Additionally, the telephone number retrieved from the caller ID information has also been used to automatically retrieve account information associated with the calling party for display on a computer at the station where the incoming call is to be routed.

However, there has been little further use of such caller ID information to enhance the capabilities of a telephone call/voice processing system. The present invention uses the caller ID information in a unique manner, which further enhances the capabilities of a telephone call/voice processing system.

SUMMARY OF THE INVENTION

In the present invention, caller ID information is retrieved and stored by a telephone call/voice processing system. In one embodiment of the present invention, when an incoming call is coupled to the voice mail system, the caller ID information is stored with the recorded message from the calling party. Then, when the user of the particular mailbox at which the particular message was left listens to the message, the user may initiate an automatic call back to the calling party. This is made possible by the telephone call/voice processing system retrieving the caller ID information, which includes the telephone number and/or name of the calling party, and then placing an outgoing call using the retrieved telephone number.

In another embodiment of the present invention, a user may add a particular phone number to that user's calling list (e.g., a speed dial list) while either speaking with the calling party or listening to a message left by the calling party. In both cases, the caller ID information associated with the calling party is stored within the calling list for later use by the telephone user.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
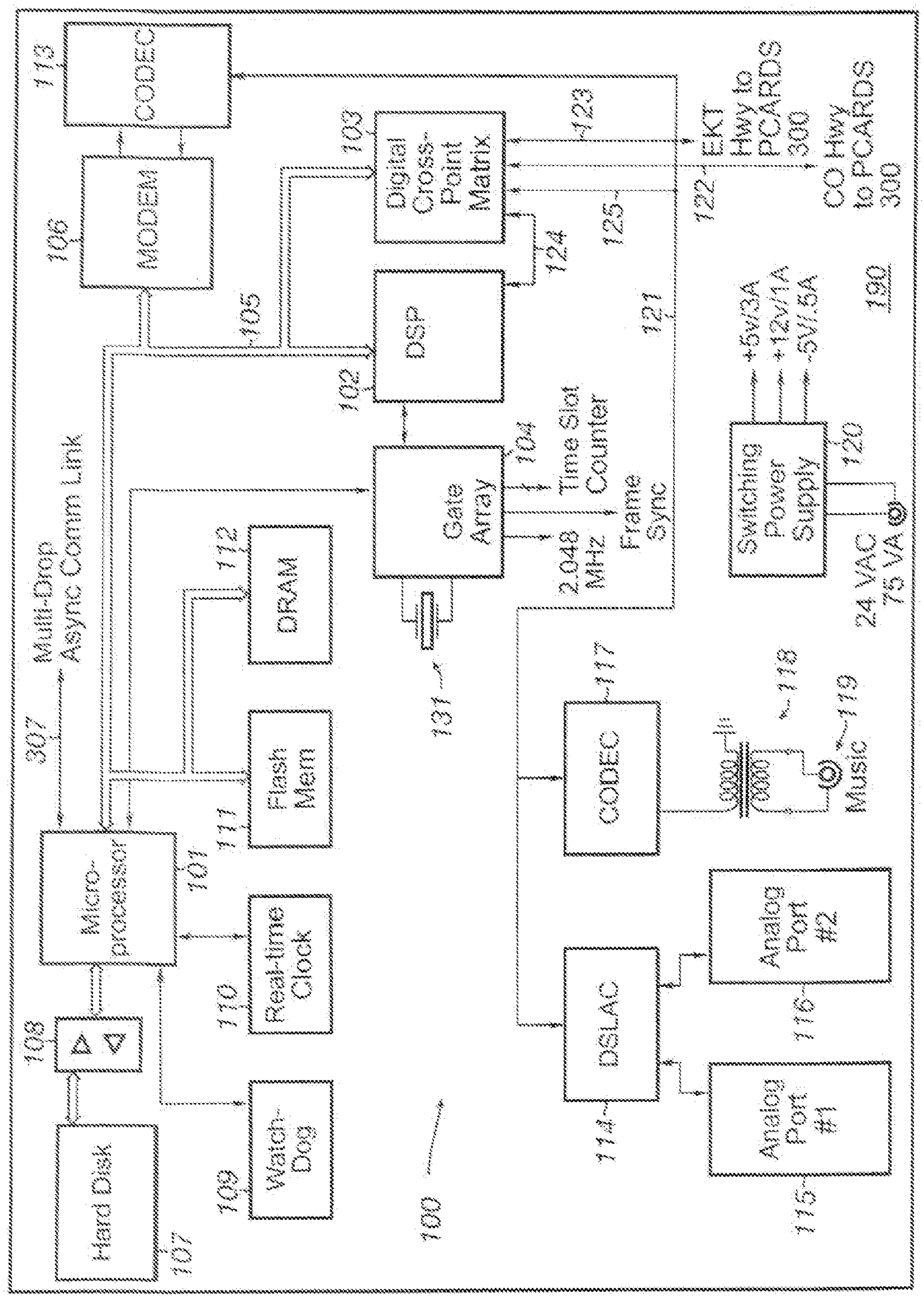
FIG. 1 illustrates, in block diagram form, components of a telephone call/voice processing system.

In the following description, numerous technical details are set forth such as specific word length and specific hardware interfaces, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated, in block diagram form, system 100 for telephone call and voice processing. Microprocessor 101, which may be a Motorola 68000 class microprocessor, communicates with hard disk 107 using driver circuitry 108. Hard disk 107 stores program data, voice prompts, voice mail messages, and all other types of speech used within system 100.

Microprocessor 101 also includes watchdog timer 109 and real-time clock source 110.

Microprocessor 101 is coupled via bus 105 to flash memory 111 and dynamic random access memory ("DRAM") 112. Flash memory 111 is used to store bootstrap data for use during power up of system 100. DRAM 112 stores the program accessed by microprocessor 101 during operation of system 100.

Bus 105 also couples microprocessor 101 to signal processing circuitry, which in this example is digital signal processor ("DSP") 102. Digital signal processor ("DSP") 102 implements a number of functions traditionally implemented by discrete analog components.

Figure 5:
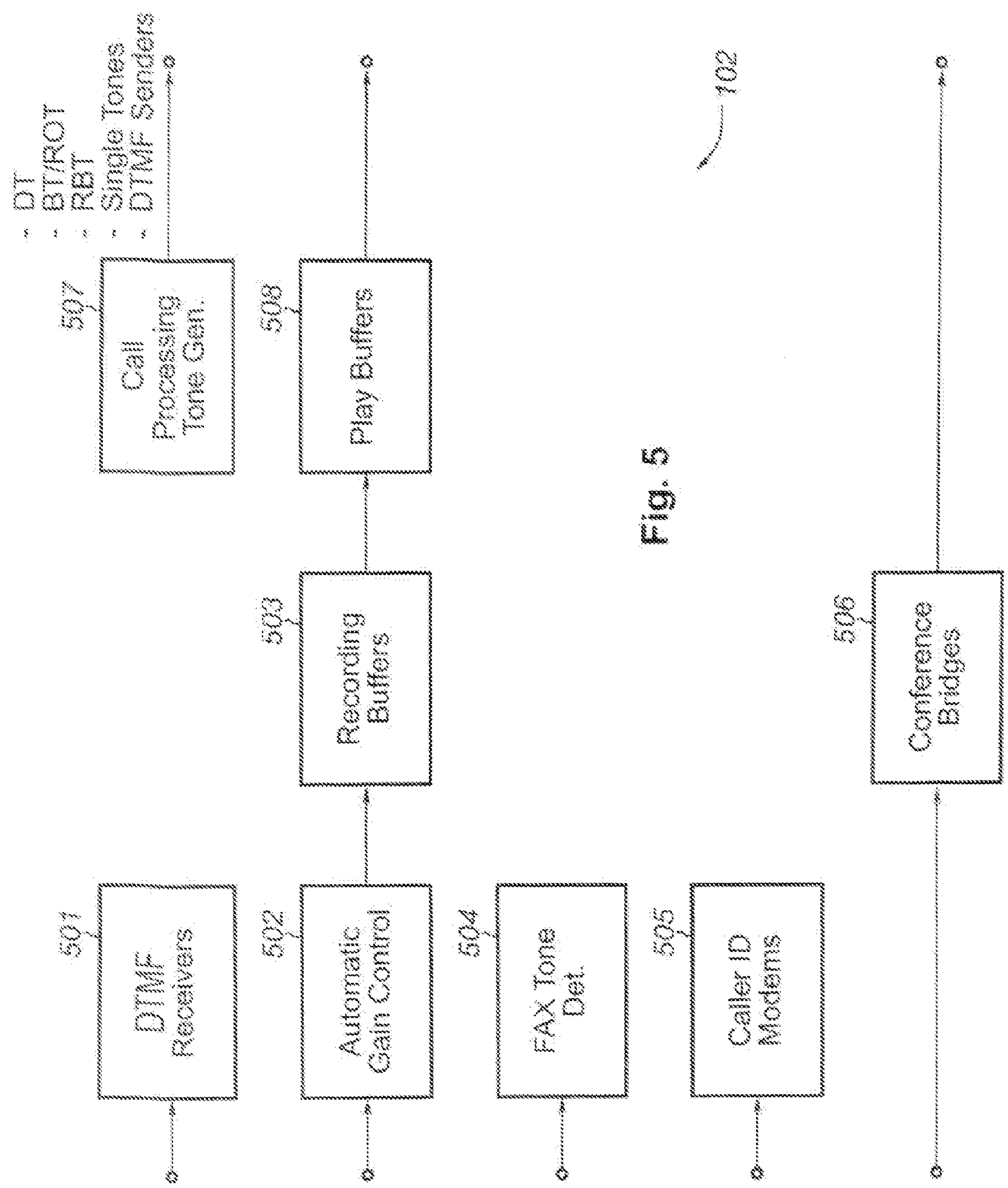
FIG. 5 illustrates functions implemented within a signal processing circuit within the telephone call/voice processing system of FIG. 1.

Referring next to FIG. 5, there are illustrated some of the primary functions implemented in DSP 102. DTMF receivers 501 are implemented using frequency domain filtering techniques. DTMF receivers 501 detect all 16 standard DTMF (touch-tone) digits.

Automatic gain control ("AGC") 502 is a closed-loop gain control system which normalizes received audio levels during recording.

Recording buffers 503, which are coupled to AGC 502, receive and store speech samples after they have passed through AGC block 502. These speech samples are converted to μ-law PCM (Pulse Code Modulation) and double buffered (several samples per buffer). Microprocessor 101 copies the record data out of DSP buffers 503 into RAM buffers (not shown), which are located in the microprocessor 101 data RAM area.

Fax tone detector 504 is implemented using frequency domain filtering techniques. Fax tone detector 504 detects the standard 1100 Hz FAX CNG tone (also referred to as the Calling Tone).

Caller ID data is transmitted from the Central Office ("CO") using a Frequency Shift Keying "FSK" modulation scheme. FSK works by converting binary data to tones that can be transmitted over the voice network. The CO transmits the caller ID data between the first and second rings of the phone. The caller ID data is received in the form of tones by caller ID modems 505. These tones are then converted back to digital caller ID data. For further discussion of caller ID, please see SPCS Customer Premises Equipment Data Interface, #TR-TSY-0030, available from Bellcore.

Call processing tone generators 507 are free running oscillators which generate the appropriate tones (and tone pairs) which make up the industry standard call processing tones. These tones include:

dial tone
busy/reorder tone
ring back tone
single frequency (440 Hz) tone
DTMF dialer tones Play buffers 508 replay data from hard disk 107 through microprocessor 101 and place this play data in buffers 508. This data is converted from an 8-bit μ-law PCM signal to 14-bit linear data.

Conference bridges 506 allow multiple conference bridges to mix together conferees into a multi-party conference. These conferees may be a mixture of inside and outside parties. A combination of "loudest speaker" and "summing" is utilized.

DSP 102 communicates with microprocessor 101 via a host interface port ("HIP") via bus 105. The HIP link supports a command-based protocol, which is used to directly read or write DSP memory locations. DSP 102 is a RAM-based part and has its program downloaded from microprocessor 101. Once downloaded and running, microprocessor 101 (the host) polls for events or receives interrupts indicating that data is available. DSP 102 speech connections are made over an industry standard 32-time slot, 2.048 megabits per second (Mb/s) digital serial link 124. Link 124 occupies one of the digital highways implemented by digital cross-point matrix 103. Each service of DSP 102 occupies a single time slot. For example, DTMF receiver 1 occupies time slot 0 while conference bridge circuit 12 occupies time slot 31.

Digital cross-point matrix 103 is also coupled to bus 105 and operates to connect any voice path to any other voice path. Digital cross-point matrix 103 is a VLSI (Very Large Scale Integration) integrated circuit. An example of digital cross-point matrix 103 is manufactured by MITEL Semiconductor Corporation as part No. 8980. Digital cross-point matrix 103 communicates with microprocessor 101 via a memory mapped input/output (I/O) scheme. A command/control protocol is used for communication between microprocessor 101 and digital cross-point matrix 103 via bus 105. Cross-point matrix 103 is coupled by highway 124 to DSP 102. Cross-point matrix 103 is coupled by connection 125 to highway 121. Cross-point matrix 103 is also coupled to peripheral cards by highways 122 and 123. The peripheral cards are described in further detail below with respect to FIG. 3.

Connections 121–125 are referred to as "highways", which are transmission links using time-division multiplexing ("TDM") as a means for transmitting and receiving data.

Digital cross-point matrix 103 is capable of making 256 simultaneous fully non-blocking connections within system 100. However, system 100 may be upgraded by adding additional DSPs and/or cross-point matrices.

Cross-point matrix 103 makes connections using the TDM highway by receiving instructions from microprocessor 101 to interconnect channels within the frames of the TDM bit stream. This results in the non-blocking capability of cross-point matrix 103, and also allows for a single voice resource, caller, or voice message to be simultaneously coupled to multiple other voice resources, station or CO originated callers, and/or voice messages.

Gate array 104 is an SRAM (Static Random Access Memory) based device. An example of gate array 104 is manufactured by XILINX. Gate array 104 is responsible for generating all system timing. A master clock signal is provided by microprocessor 101 at 16.384 MHz. This clock signal is divided down to provide a number of phase coherent system clocks such as 4.096 MHz, 2.048 MHz and 8 KHz (frame sync). In addition, a 5-bit time slot counter is implemented which allows all the system CODECs to detect the appropriate time slot to use (0–31). An additional divider chain is included to divide the system clock down to 20 Hz, which is used by the ringing generator power supply (not shown).

Gate array 104 is downloaded at boot-up by system software. Gate array 104 is based on an SRAM architecture. That is, the internal fusible links commonly found in programmable logic are actually stored in volatile SRAM. Because of this architecture, gate array 104 is downloaded after power-up. Also, note the added flexibility of being able to modify the logic by simply loading new system software. Because the device is SRAM-based, it loses its programming when power is removed.

Bus 105 is also coupled to modem 106, which provides a capability of calling into system 100 on a remote basis to load additional programs, voice prompts, etc., or updates thereto, into hard disk 107. Modem 106 is coupled to coder/decoder ("CODEC") 113, which is coupled to highway 121. This connection allows coupling of modem 106 through cross-point matrix 103 to CO lines through highway 122 and the p-card described below with respect to FIG. 3.

Also coupled to highway 121 is dual subscriber line access chip 114, which is well-known in the art, and which is coupled to analog ports 115 and 116, which provide an ability for system 100 to communicate to analog-type connections such as cordless telephones and fax machines.

Highway 121 is also coupled to CODEC 117, which is coupled to transformer 118 to a music source 119, which provides an ability to couple an external music source to a caller through cross-point matrix 103 for such things as providing the caller with music on-hold.

Power to system 100 is provided through switching power supply 120, which converts AC to the various DC supply voltages needed by circuitry within system 100.

Figure 3:
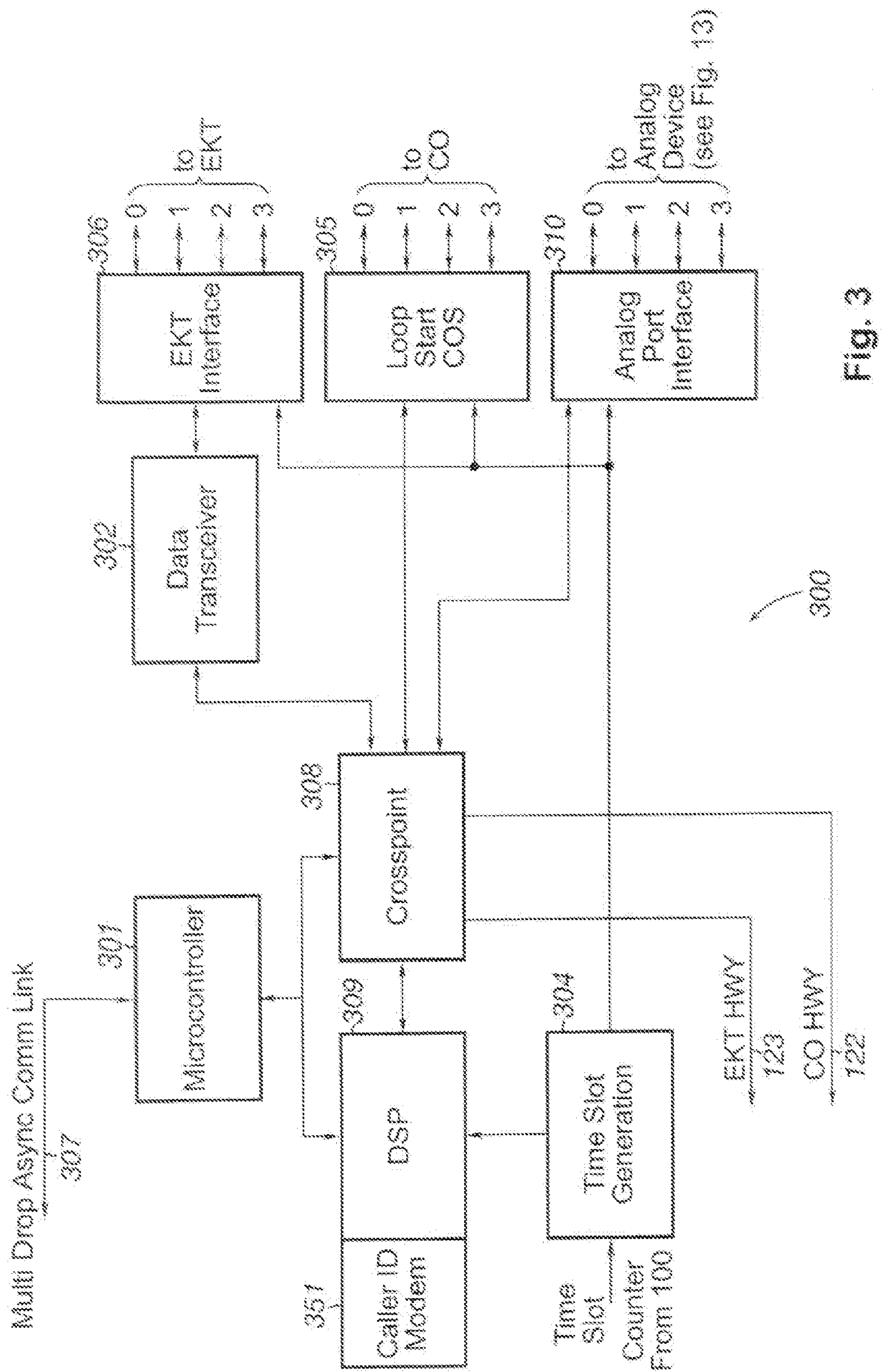
FIG. 3 illustrates, in block diagram form, components of a port card implemented within the telephone call/voice processing system of FIG. 1.

Referring next to FIG. 3, there is illustrated peripheral-card ("p-card") 300, which is coupled to main board 190 of system 100. Main board 190 communicates with p-card 300 via a multi-drop async serial link 307. This connection 307 is made directly to microprocessor 101 (via buffers not shown). P-card 300 provides interconnections between CO lines and extension lines to system 100.

Microcontroller 301 is an 8-bit microcontroller, an example of which is manufactured by Hitachi as Part No. H8, which controls all the real-time functions associated with p-card 300. Microcontroller 301 is responsible for all low-level communication with the EKTs 1400 (electronic key telephones) (see FIG. 8) and CO lines. A low level event is an event which is specific to the hardware and is required to be handled in real-time. These events are unique to the EKT or CO trunk protocol. In contrast, high level events can be abstracted to have no correlation to actual hardware. An example of a high level event might be "Turn the SPKR LED On." The corresponding low-level event would be "Send HEX Code 21 to EKT Address 4." This level of abstraction helps stabilize the complex system software. Another example would be that system software can send a command to seize a CO trunk without being concerned with the low-level differences between a ground start or DID trunk. Some of the low-level tasks include updating EKT LEDs and LCD displays, decoding key press messages from the EKTs 1400, scanning the CO status bits and filtering RING and CO seizure events.

Microcontroller 301 converts these low-level real-time events to high-level events which form a protocol referred to as the ESi Command Language (ECL). This ECL protocol is implemented on multi-drop async serial channel 307 between main board 190 and all p-cards 300 in system 100. Microcontroller 301 contains 2 async serial ports. One of these serial ports is connected to main board 190, and the other port drives data transceiver and multiplexer 302.

When p-card 300 is plugged into main board 190 (via ribbon cable (not shown)) a card address is assigned to p-card 300. This card address is read by microcontroller 301 and is used to filter commands over communication link 307. When main board 190 software wants to communicate with the specific p-card 300, the address is sent in the message packet which all p-cards 300 receive. P-cards 300 match the address in the message to the hard wired address on the ribbon cable. If a match is made, only that p-card 300 responds to the command set.

Microcontroller 301 contains an internal program memory (not shown) which contains a bootstrap program which upon reset or power-up requests a fresh firmware load from main board 190. This firmware load is stored in the main memory of microcontroller 301. Upon completion of the load, the program is executed from main memory. This scheme allows for microcontroller 301 firmware to be updated and loaded at any time.

Main board 190 sources all system timing through block 304. Timing signals to p-card 300 consists of a 2.048 MHz clock signal, an 8 KHz frame sync, which signifies the first time slot of a 32 time slot highway, and 5 time slot counter bits, which represent a binary count from 0 to 31.

As mentioned above, p-card 300 is assigned a card slot address when it is connected to main board 190. This card slot address is used to calculate which time slots p-card 300 should be using. The time slots used for the CO CODECs 1204 (see FIG. 7) are actually generated by the time slot assignment circuitry contained in the DSLAC chip. There are two separate 2.048 MHz (32 time slot) highways 122 and 123 that run between main board 190 and p-card 300. One (123) is for the EKTs 1400 and the other (122) is for the COs.

Figure 6:
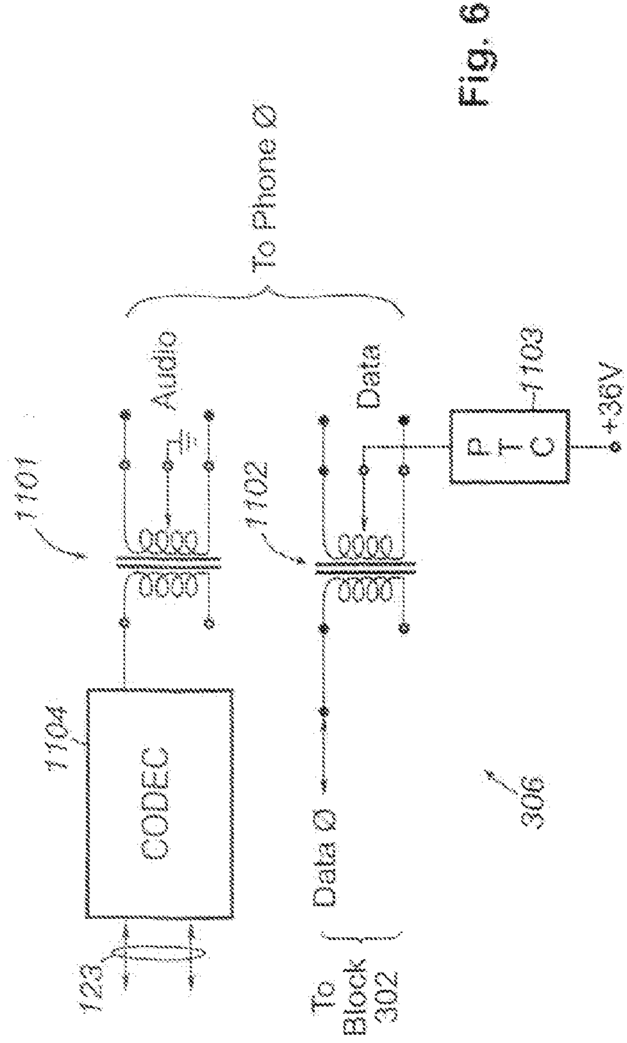
FIG. 6 illustrates an electronic key telephone interface.

Referring to FIGS. 3 and 6, EKT interface 306 describes the connection between system 100 and electronic key telephone (EKT) 1400. This interface consists of two physical pairs of wires running between system 100 (often referred to as a Key System Unit (KSU)) and EKT 1400. One of these pairs supports an analog bi-directional audio path and the other supports a bi-directional digital control channel.

EKT 1400 is connected to the KSU via transformers 1101 and 1102, providing a high degree of isolation as well as longitudinal balance. Transformer 1101 is for the audio path and transformer 1102 is for the data path on each end of the connection. Power is supplied to EKT 1400 by phantoming the power through the center taps of transformers 1101 and 1102. The KSU supplies a nominal voltage of 36 volts DC which passes through a positive temperature co-efficient varistor ("PTC") 1103. PTC 1103 acts as a resettable fuse which becomes very resistive during excessive current flow (such as when a short in the station wiring occurs). EKT 1400 regulates down to +12 and +5 volts.

The audio path is a dry analog bi-directional path consisting of a traditional hybrid (2:4 wire converters) on each end. The audio path on p-card 300 is converted to a 4-wire path by the hybrid circuit in interface 306. The separate transmit and receive paths are gain adjusted and connected to CODEC 1104. CODEC 1104 converts the analog signals to digital and presents these voice signals to EKT highway 123. EKT highway 123 consists of a 2.048 Mb/s serial stream which is divided into 32 64 Kb/s time slots. Each CODEC 1104 occupies one time slot on highway 123. System 100 reserves two time slots per EKT 1400 for future migration to a fully digital 2B+D EKT where two 64 Kb/s digital channels are available to each station instrument.

Timing for CODECs 1104 is supplied by time slot generation block 304, which is coupled to the time slot counter output from system timing block 104 (see FIG. 1).

The EKT data is produced by a UART (Universal Asynchronous Receiver/Transmitter) in microcontroller 301. This NRZ transmit and receive data is presented to data transceiver and multiplexer 302. A single data transceiver is used for all 8 EKT circuits and is multiplexed through an 8-channel analog mux to each EKT data transformer 1102 in a round-robin fashion.

Messages to EKT 1400 consist of commands such as POLL, TURN_ON_LED, WRITE_LCD_CHARACTER, RING PHONE, etc. Response messages from EKT 1400 consists of a lower level key command in the first 5 bits and a single hook switch bit in the 8th bit. If the 7th bit of the response message is set, a high level response command such as FIRMWARE_VERSION or TERMINAL_TYPE is present in the first 5 bits.

Figure 7:
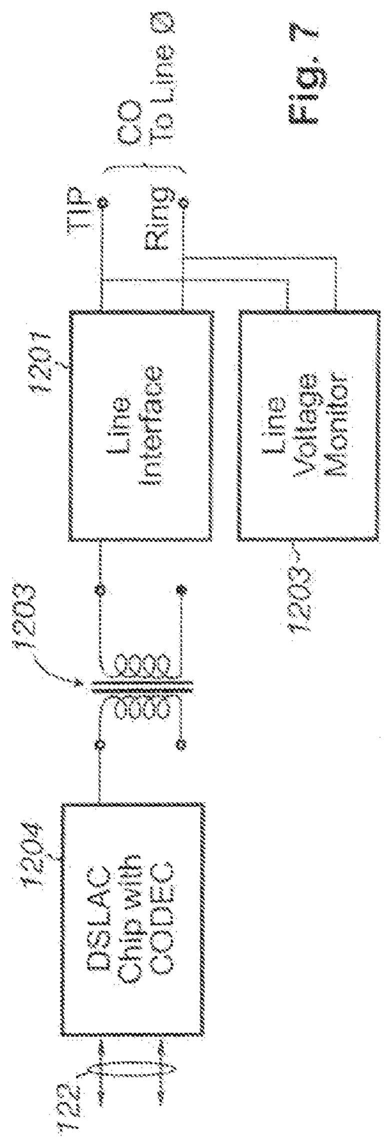
FIG. 7 illustrates a loop start CO interface.

Referring next to FIGS. 3 and 7, the loop start central office (CO) lines are supplied by the local telephone company and consist of a wet balanced differential audio pair.

The term "wet" refers to the fact that a voltage of −48 volts is present on the pair. System 100 requests dial tone from the CO by providing a nominal 200 ohm loop across the TIP and RING conductors and releases the connection by opening the loop.

The CO rings system 100 by placing a 90 vrms AC, 20 Hz sine wave on the TIP and RING conductors. System 100 seizes the line by going off hook.

P-card 300 incorporates a unique circuit which monitors the voltage present across TIP and RING of each CO. This line voltage monitor circuit 1202 serves to detect the ring voltage present during ringing (ring detection) and the unique feature of monitoring the CO line status for conditions such as whether the CO is plugged in or if someone is off hook in front of system 100. The latter can be used to detect theft of service or allow a credit card verification terminal to be used without interfering with normal system operation.

Voltage monitor 1202 consists of a balanced differential op-amp connected across TIP and RING of the CO lines through a very high impedance (>10 M ohms). The output of the four voltage monitor op-amps are fed to an analog-to-digital converter with a built-in analog multiplexer (not shown). Microcontroller 301 firmware monitors the line voltages.

There is also a balanced differential AC coupled op amp across the CO TIP and RING to monitor the low level audio tones present during caller ID. The output of these op-amps are selected via an analog switch during the idle period and are connected to the CO line CODEC 1204.

To correctly terminate the CO line (seizure) care must be taken to satisfy the DC loop requirements (−200 ohms) and the AC impedance requirements (−600 ohms). The classic approach has been to terminate TIP and RING with an inductor (called a holding coil) which has a large inductance (>1 Hy) and a DC resistance of −200 ohms. The inductor separates the AC and DC components to give the desired effect. The problem is that the inductor must be large enough not to saturate with currents as high as 100 milliamps. An inductor which satisfies these requirements is physically cumbersome.

P-card 300 incorporates a solid state inductor circuit called a gyrator (not shown) to implement the holding coil function. This single transistor emulates an inductor with the above requirements while taking up very little PCB space.

A small solid state relay (not shown) is used as the hook switch. When energized, the gyrator holding coil is placed across TIP and RING closing the loop. The audio present on TIP and RING is AC coupled to a small dry transformer 1203. The secondary of this transformer 1203 is connected to the AC termination impedance and to the CODEC 1204, which is implemented on a dual subscriber line access chip ("DSLAC").

High voltage protection is provided for all paths on the TIP and RING connections. These paths include TIP to RING, TIP to GROUND, RING to GROUND, and TIP and RING to GROUND. This high voltage protection is accomplished by first passing the TIP and RING conductors through positive temperature coefficient varistors (not shown). These varistors act as resettable fuses. When excessive current flows through these varistors, they become resistive thus limiting the current flow. When the excessive current is stopped, the original resistance is restored.

DSLAC 1204 consists of two identical circuits which contain the CODEC, DSP-based echo canceller, gain control and time slot assignment circuit. DSLAC 1204 is controlled by microcontroller 301 to set parameters such as echo canceler co-efficients, gain co-efficients and time slots.

Figure 8:
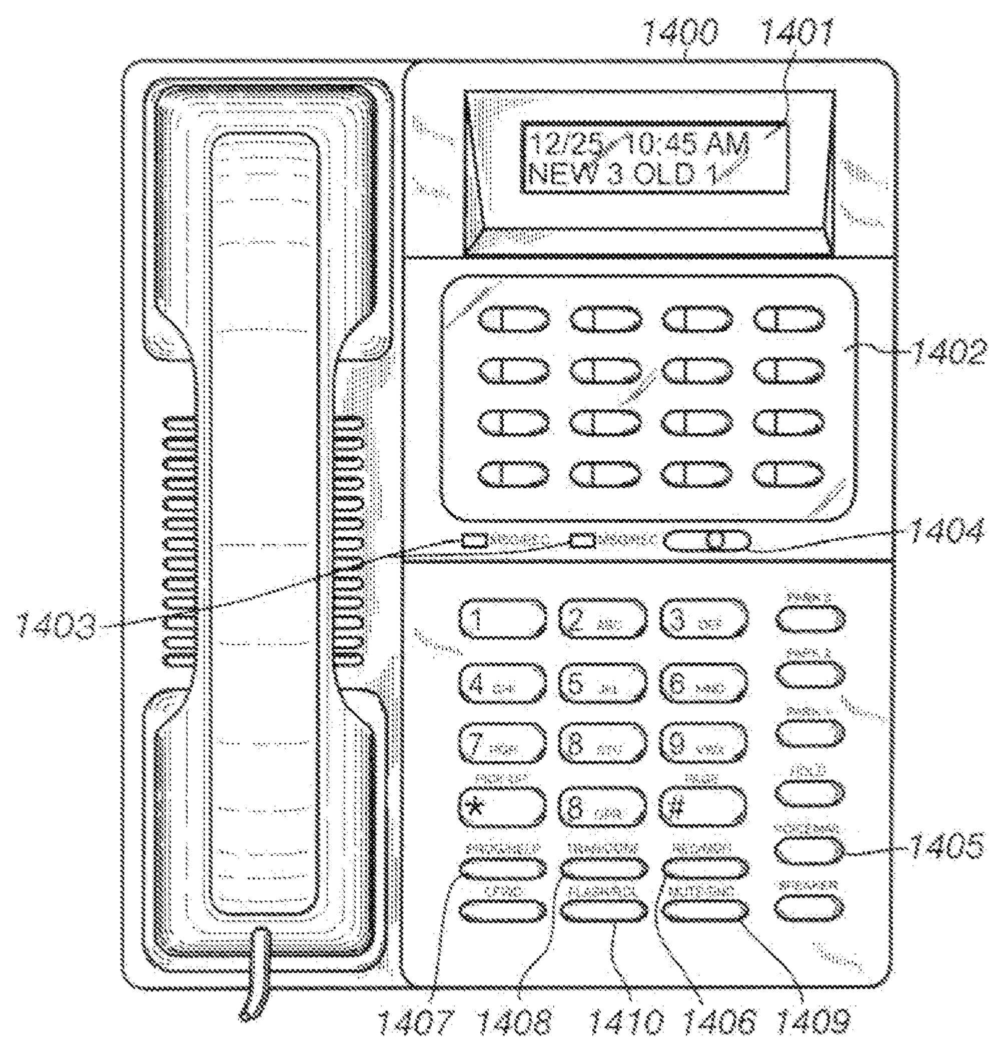
FIG. 8 illustrates an EKT.

Referring next to FIG. 8, there is illustrated EKT 1400, which includes many of the well-known features of a typical telephone, such as LCD display 1401, soft feature keys 1402 for such features as Station, Speed Dial, Line Keys, etc., speaker/handset volume control 1404, and message and speaker LEDs 1403.

In the following discussion, typical caller ID information will be assumed to contain the ten-digit telephone number of the calling party and/or the name of the person or business originating the call. The caller ID information detected and retrieved by caller ID modems 505 within DSP 102, which may then send this information to microprocessor 101 for storage within hard disk 107 or some other memory means.

Figure 9:
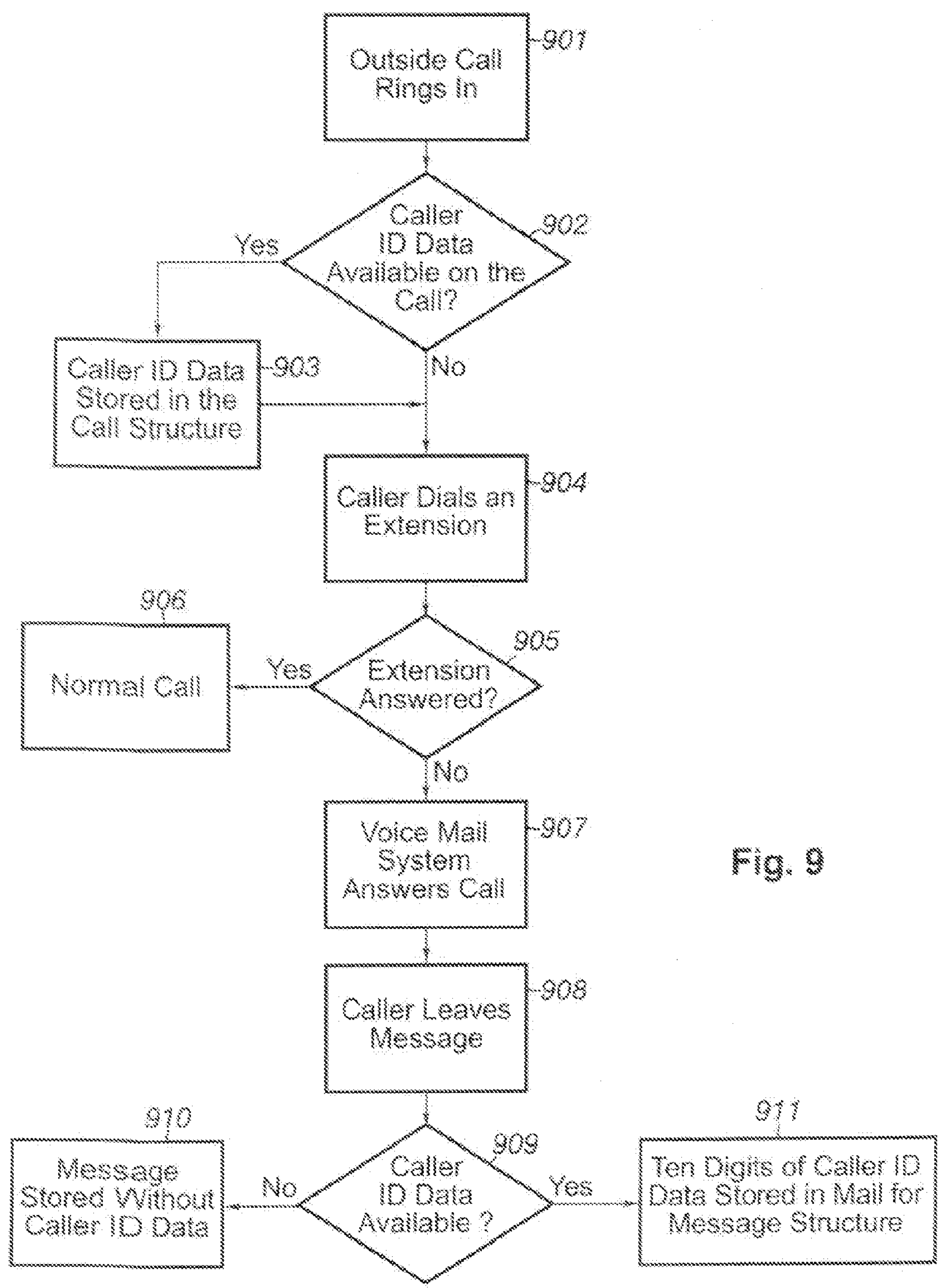
FIG. 9 illustrates a process for storing caller ID information with a voice mail message.

Referring next to FIG. 9, there is illustrated a process for storing caller ID information with a voice mail message. In step 901, an outside call rings in to system 100. As discussed above, a caller ID modem 505 will be coupled via digital crosspoint matrix 103 to the incoming call. In step 902, if caller ID data is available with the incoming call, then in step 903, this caller ID data is retrieved and stored in data structures on hard disk 107. Nevertheless, the process proceeds to step 904 where the incoming call dials an extension telephone (e.g., EKT 1400) coupled to system 100. This may occur when the incoming call is automatically answered by an automated operator and is requested to enter an extension telephone number.

In step 905, if the extension dialed is answered by a user at that extension, then the incoming call is processed normally in step 906. However, if the extension is not answered within a specified time period, then in step 907, a voice mail system will answer the call whereby the incoming call is able to leave a message in step 908 in the voice mailbox associated with the dialed extension. In step 909, if caller ID information is not available with the incoming call, then in step 910, the voice mail message is stored without any caller ID data. However, if there is caller ID data available, then a specified number of digits of the caller ID data is stored in the mailbox message structure. Such caller ID data may be stored in a specified field in the mailbox message structure.

Figure 10A:
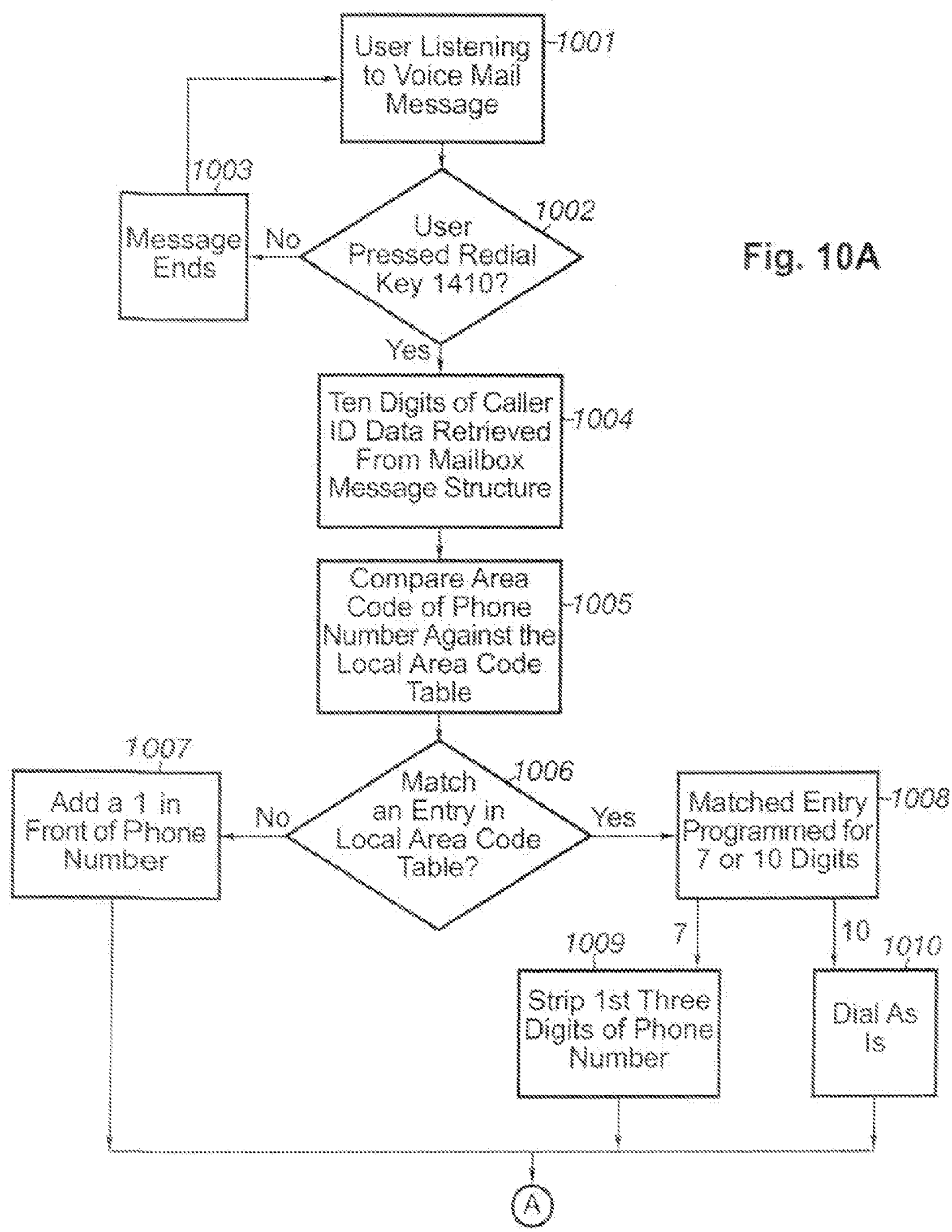
FIGS. 10A and 10B illustrates a process for re-dialing using stored caller ID information.
Figure 10B:
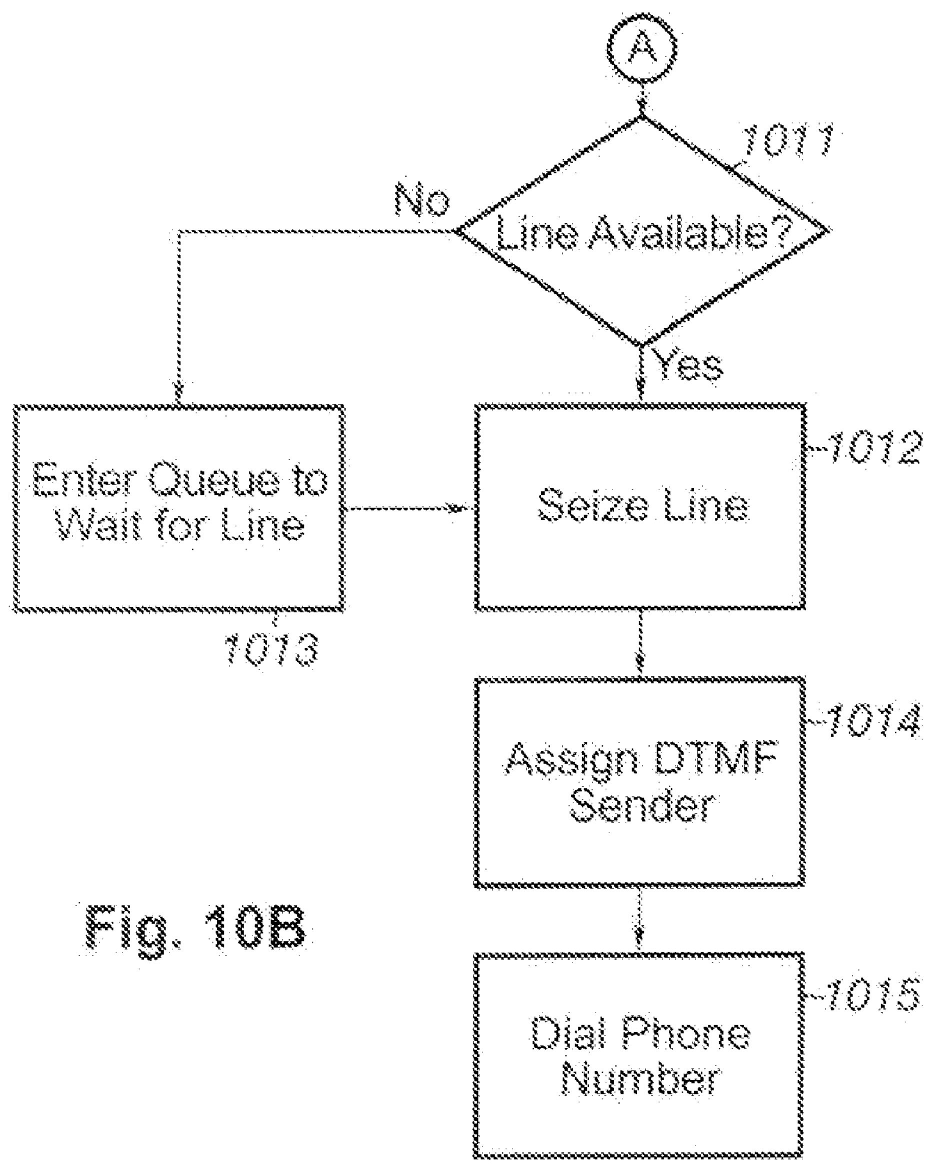

Referring next to FIGS. 10A and 10B, there is illustrated a process for re-dialing using the caller ID information stored in the manner illustrated above with respect to FIG. 9. In step 1001, a user at an extension is listening to the voice mail message left to them by an outside call (see step 908). In step 1002, if the user has not pressed a redial key 1410, then the user continues to listen to the voice mail message until the voice mail message ends in step 1003. However, if the user presses the redial key 1410 while listening to the voice mail message, then the process proceeds to step 1004 whereby the caller ID data stored along with the message within the mailbox message structure is retrieved to speed dial data structures in DRAM 112, which are then supplied to the dialing task. Thereafter, in step 1005, the first three digits of the retrieved ten-digit phone number are compared against a table of area codes to determine if the call is a local call or a long distance call. If in step 1006 there is a match with an entry in the Local Area Code Table, then the process proceeds to step 1008 to determine whether or not the matched entry is programmed for seven-digit local dialing or ten-digit local dialing. If the matched entry is programmed for seven digits, then the first three digits of the retrieved phone number are stripped in step 1009. If the matched entry is programmed for ten digits, then in step 1010 the number is passed "as is" for dialing out.

If the retrieved telephone number does not match an entry in the Local Area Code Table, then the process proceeds to step 1007 to add a digit "1" in front of the retrieved phone number.

From any one of steps 1007, 1009, or 1010, the process proceeds to step 1011 to determine whether or not an outside line is available within system 100. If not, a queue is entered to wait for an available outside line in step 1013. Once a line is available, then in step 1012 the outside line is seized by system 100, and in step 1014, a DTMF sender 507 is assigned and the retrieved telephone number is dialed in step 1015.

The process described above with respect to FIGS. 9 and 10A–10B enables a user at a telephone extension coupled to system 100 to merely press one key, such as a redial button, on their telephone while listening to a voice mail message in order to make an outgoing telephone call to the calling party who left the voice mail message. This is accomplished by storing the caller ID information retrieved from the incoming call along with the voice mail message so that the present invention may retrieve that caller ID information if such a redial procedure is enabled by the user.

Figure 4:
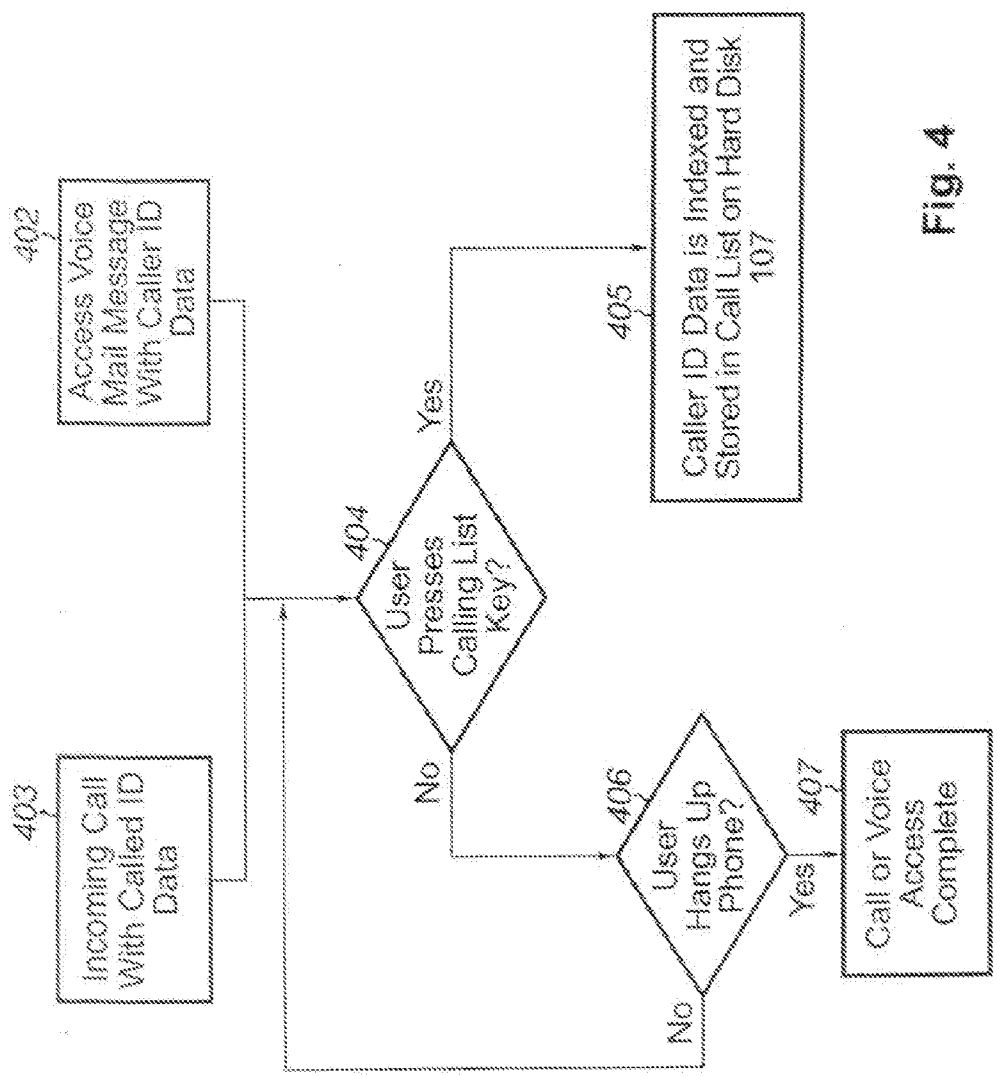
FIG. 4 illustrates a process for storing caller ID information within a calling list.

Referring next to FIG. 4, there is illustrated a process for storing caller ID information into a calling list.

This portion of the present invention may be enabled in response to either steps 402 or 403. In step 402, the user of a telephone extension accesses their voice mail in order to listen to a voice mail message left in their mailbox. As discussed above with respect to FIG. 9, when a user accesses their mailbox, caller ID data may be stored along with the voice mail message.

Alternatively, this portion of the present invention may be utilized in response to step 403 whereby the user of a telephone extension has answered an incoming call, which has caller ID data associated therewith.

Thereafter, in step 404, while either listening to the voice mail message or while speaking with the incoming caller, the user may press the calling storage key which may be programmed onto any of the keys contained within area 1402 on their telephone. Until the time when the user presses such key, the normal telephone conversation or voice mail access will continue.

Once the user presses the calling list storage key in step 404, the caller ID information associated with the incoming call or stored along with the voice mail message is indexed and stored within a data structure on hard disk 107 in step 405. For example, the caller ID data that identifies the calling party will be stored along with the telephone number of the calling party in alphabetic order. However, if while the user is listening to the telephone conversation or voice mail, the user hangs up the telephone in step 406, the call or voice access will be completed in step 407.

Figure 2A:
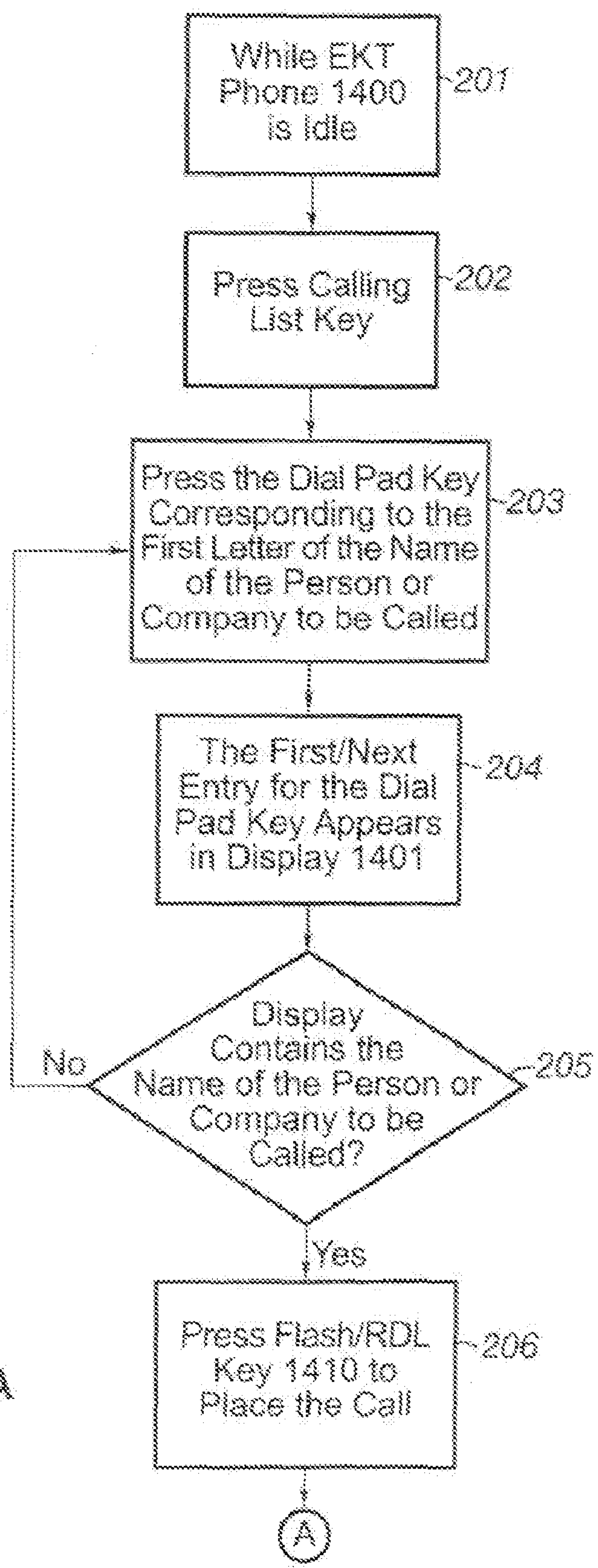
FIG. 2 illustrates a process for placing a call using caller ID information stored in a calling list.

Referring next to FIG. 2, there is illustrated a process whereby the caller ID information stored by the process described above with respect to FIG. 4 is utilized to place a call by the user. In step 201, the user is not using EKT 1400 (the user's extension is idle). In step 202, the user presses the calling list key. In step 203, the user presses the dial pad key on phone 1400 corresponding to the first letter of the name of the person or company they wish to call. In step 204, the first/next entry for the dial pad key appears in display 1401. For example, if the user wishes to call John Doe, then the use will press the "3" key on the touch-tone pad of telephone 1400 in step 203. At that time, the first entry in the user's indexed calling list beginning with the letters D, E or F will appear on display 1401. The data displayed on display 1401 is the same caller ID data that came in with the original call. The first line of the display 1401 contains the name of the person or company. The second line contains the ten-digit phone number. This data is supplied to the EKT 1400 from processor 101 through the same series of messages passed through the multi-drop async serial link 307.

If in step 205, the entry appearing on display 1401 displays the party that the user wishes to call, then in step 206, the user can press the flash/redial key 1410 to place the call. However, if in step 205, display 1401 does not show the desired calling party, then the process returns to step 203 whereby the user can press another dial pad key in order to essentially scroll through their stored calling list. The process proceeds to step 207 whereby the caller ID data stored along with the message within the mailbox message structure is retrieved to speed dial data structures in DRAM 112, which are then supplied to the dialing task. Thereafter, in step 208, the first three digits of the retrieved ten-digit phone number are compared against a table of area codes to determine if the call is a local call or a long distance call. If in step 209 there is a match with an entry in the Local Area Code Table, then the process proceeds to step 211 to determine whether or not the matched entry is programmed seven-digit local dialing or ten-digit local dialing. If the matched entry is programmed for seven digits, then the first three digits of the retrieved phone number are stripped in step 214. If the matched entry is programmed for ten digits, then in step 213 the number is passed "as is" for dialing out.

If the retrieved telephone number does not match an entry in the Local Area Code Table, then the process proceeds to step 210 to add a digit "1" in front of the retrieved phone number.

From any one of steps 210, 213, or 214, the process proceeds to step 215 to determine whether or not an outside line is available within system 100. If not, a queue is entered to wait for an available outside line in step 217. Once a line is available, then in step 216 the outside line is seized by system 100, and in step 218, a DTMF sender 507 is assigned and the retrieved telephone number is dialed in step 219.

Figure 11:
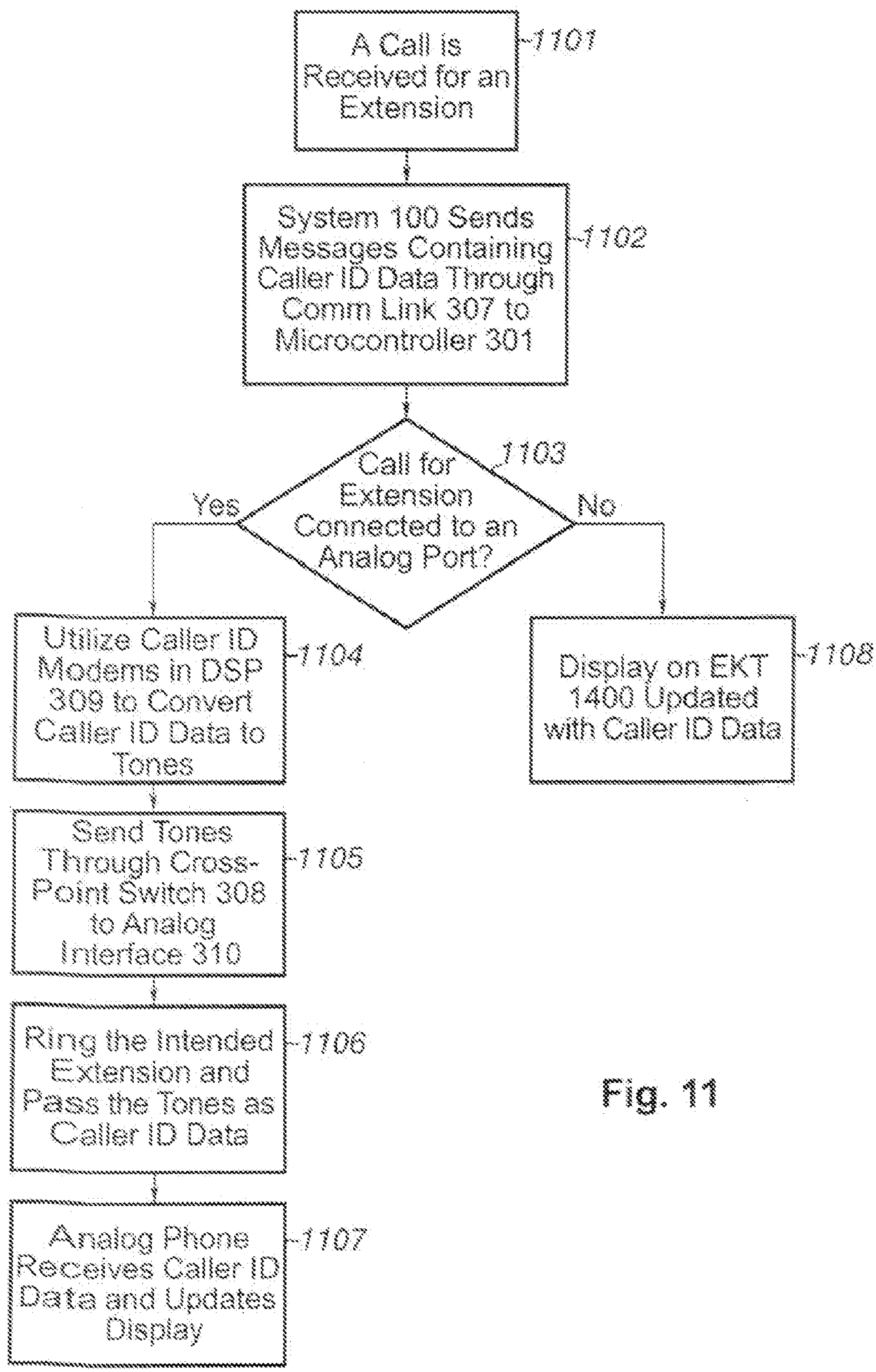
FIG. 11 illustrates a process for displaying caller ID information.
Figure 13:
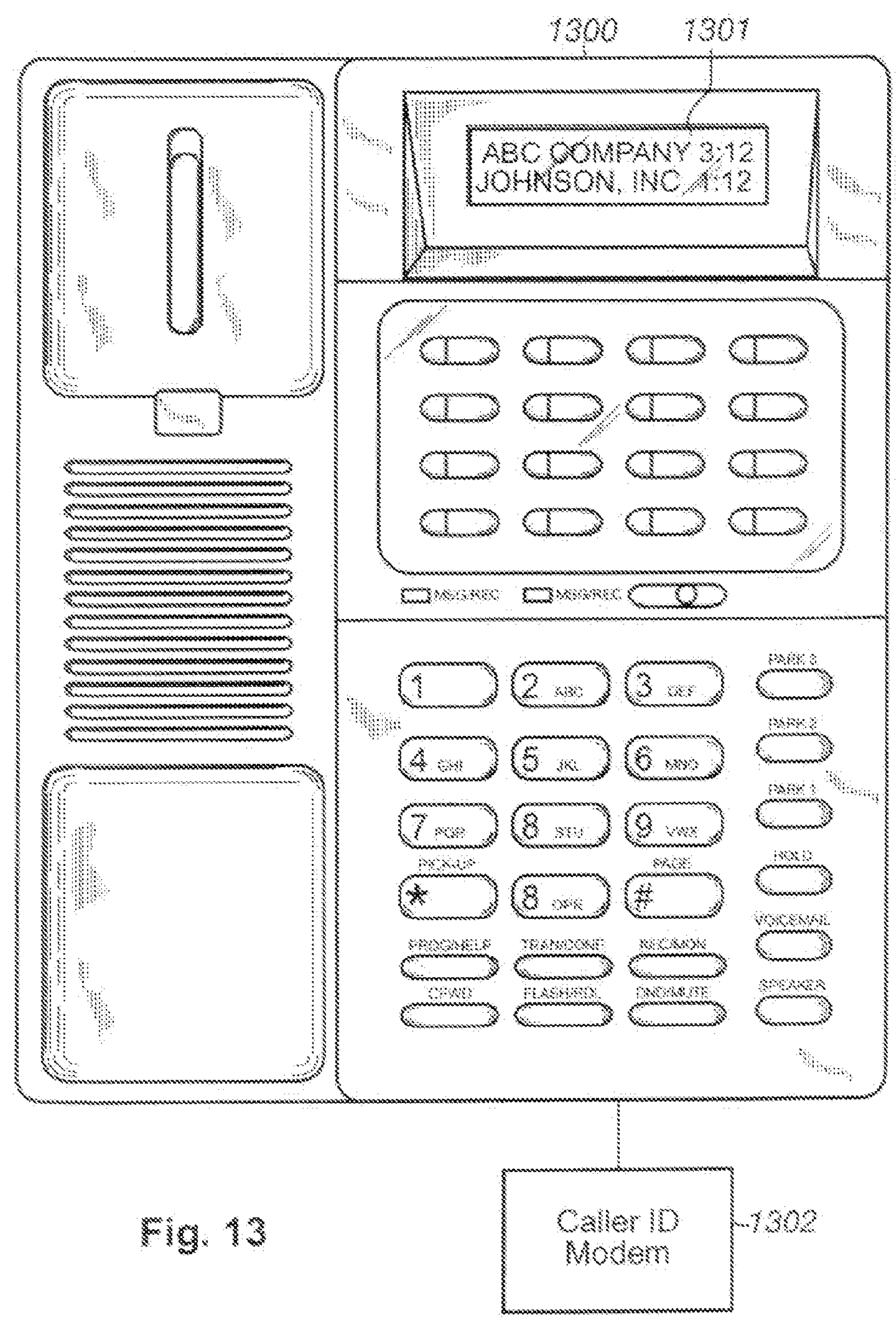
FIG. 13 illustrates an analog telephone with a display.

Returning to FIG. 3, p-card 300 supports four analog ports through interface 310. These analog ports will support a variety of devices, including an analog phone 1300 (corded or cordless) with a caller ID display 1301 (see FIG. 13). Referring also to FIG. 11, there is illustrated a process for displaying caller ID on EKT 1400 or on analog phone 1300 with a display 1301 connected to analog interface 310. In step 1101, an incoming call with caller ID data is received by system 100. As described before, caller ID data is received from the CO by caller ID modems 505 implemented in DSP 102 (located on the main board 190) and converted from FSK tones to digital data. In step 1102, this caller ID data is transmitted using messages sent through the multi-drop async comm link 307 to microprocessor 101 to microcontroller 301. Step 1103 determines if the call is for an analog extension. If not, then in step 1108, the caller ID data is routed to an EKT 1400 by passing through digital cross-point switch 308 out to Data Transceiver and Mux 302 to the EKT Interface 306 for display on the EKT 1400. In step 1104, since the caller ID data is being routed to an analog port it is first converted back to tones using caller ID modems 351 (Bell 202 compatible) (similar to modems 505) implemented in DSP 309. In step 1105, the caller ID data (in the form of tones) is sent through cross-point switch 308 to the analog port interface 310. In step 1106, the extension is rung, and the caller ID data is passed to the phone 1300. In step 1107, the analog phone 1300 uses its built-in caller ID modem 1302 to convert the tones to caller ID data which is automatically displayed in the analog phone display 1301.

Figure 12:
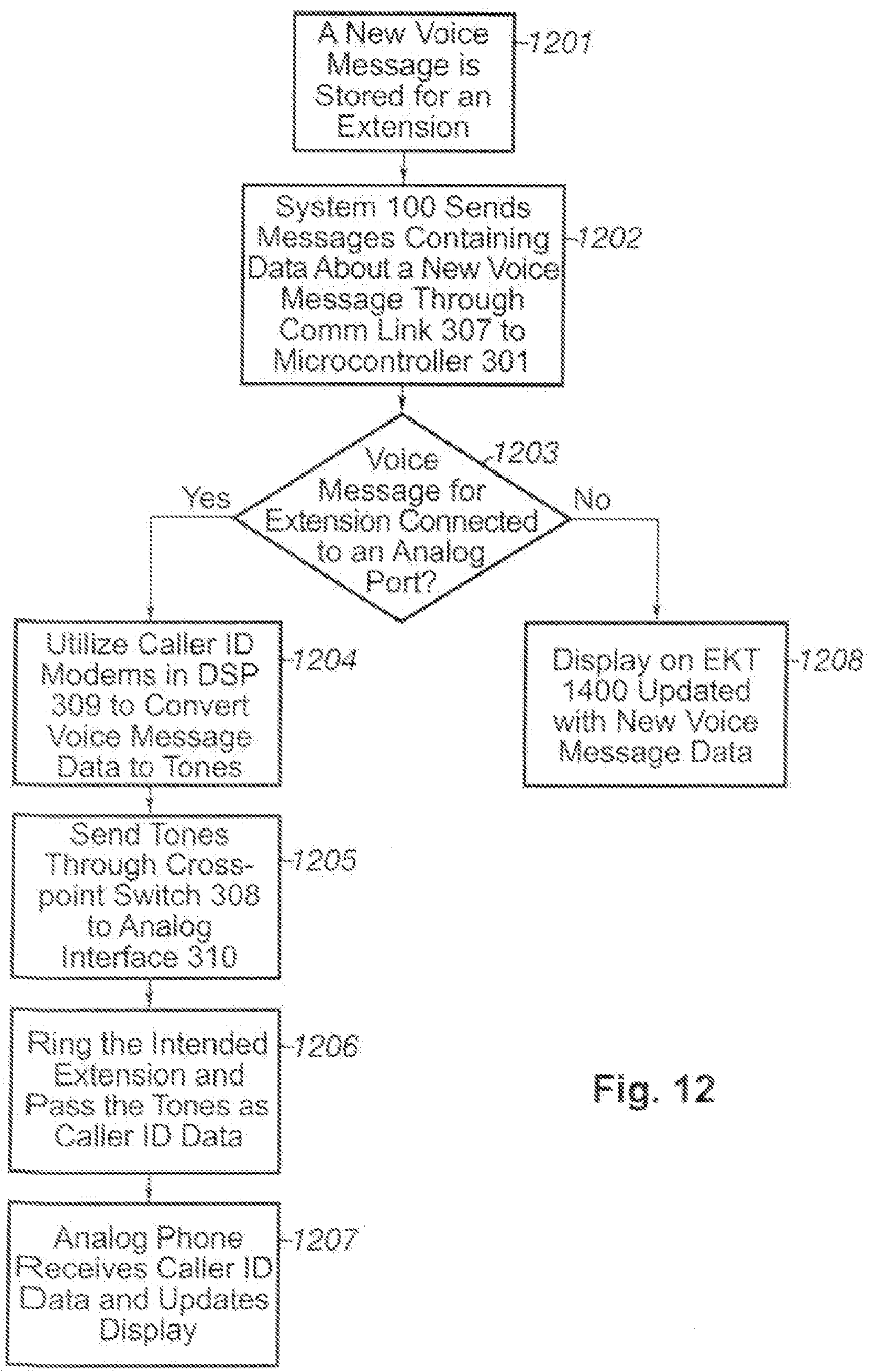
FIG. 12 illustrates a process for displaying generic messages in place of caller ID information.

Using the same technique described in the preceding paragraph, system 100 can also send other data (in addition to typical caller ID data) out to phone 1300 connected to analog port interface 310. For example, system 100 can use the caller ID modems 351 in DSP 309 to send data about the arrival of a voice message. Referring to FIG. 12, in step 1201, a voice mail message has been stored for an extension. In step 1202, system 100 sends a series of messages through the multi-drop async comm link 307 to microcontroller 301. These messages inform microcontroller 301 that a new voice message has been recorded for a particular extension. Step 1203 determines if the message is for an analog extension. If not, then in step 1208 the display on the intended EKT 1400 is updated by passing messages through the digital cross-point switch 308 out to Data Transceiver and Mux 302 to the EKT interface 306. In step 1204, if the new voice message is for an analog port, a digital message (e.g., "New Message") is formatted and converted to tones using caller ID modems 351 (Bell 202 compatible) implemented in DSP 309, where the message is temporarily stored. That is, instead of passing typical caller ID data (name and phone number), a text message is passed. In step 1205, the text message masquerading as caller ID data is sent from DSP 309 through cross-point switch 308 to the analog port interface 310. In step 1206, the extension is rung, and the text message is passed to the phone 1300 just as caller ID would be. In step 1207, the analog phone 1300 uses its built-in caller ID modem 1302 to convert the tones to caller ID data that is automatically displayed in the analog phone display 1301.

Although the present invention and its advantages have been described in detail, it should be understood that various changes, substitutions and alterations can be made herein without departing from the spirit and scope of the invention as defined by the appended claims.

What is claimed is:

1. A telephone call and voice processing system comprising:

circuitry adaptable for coupling the system to an analog telephone extension, wherein the analog telephone extension includes a display operable for displaying alphanumeric information, and wherein the analog telephone extension includes a first caller ID modem;

circuitry for creating and storing a message associated with the analog telephone extension;

a second caller ID modem coupled to the circuitry adaptable for coupling the system to the analog telephone extension;

circuitry for retrieving the message from the storing circuitry and sending the message to the second caller ID modem;

circuitry for sending the message from the second caller ID modem to the first caller ID modem; and circuitry for displaying the message on the display, wherein the message does not include a phone number and an identity of a calling party.

2. The system as recited in claim 1, wherein retrieval and sending of the message to the first caller ID modem is performed in response to receipt of an incoming call to the system intended for the analog telephone extension.

3. The system as recited in claim 2, wherein the message is sent to the first caller ID modem while the analog telephone extension is being rung by the system.

4. The system as recited in claim 3, further comprising:

circuitry for coupling the system to a public switched telephone network; and circuitry for receiving the incoming call from the public switched telephone network.

5. The system as recited in claim 3, further comprising:

switching circuitry adaptable for receiving the incoming call, wherein the switching circuitry is adaptable for connecting the incoming call to the analog telephone extension; and voice processing circuitry adaptable for automatically interacting with the incoming call, wherein the switching circuitry and the voice processing circuitry are controlled by a single processing means in the system.

6. The system as recited in claim 5, wherein the voice processing circuitry further comprises a signal processing circuitry coupled to the single processing means.

7. The system as recited in claim 6, wherein the switching circuitry further comprises a digital cross-point matrix coupled to the single processing means and to the signal processing circuitry.

8. The system as recited in claim 5, wherein the single processing means is controlled by a single set of software operable for controlling both the switching circuitry and the voice processing circuitry.

9. In a telephone call and voice processing system, a method comprising the steps of:

creating and storing a message associated with an analog telephone extension coupled to the system, wherein the analog telephone extension includes a display operable for displaying alphanumeric information, and wherein the analog telephone extension includes a first caller ID modem;

sending the message to a second caller ID modem in said system; and sending the message from the second caller ID modem to the first caller ID modem, wherein the message does not include a phone number and an identity of a calling party.

10. The method as recited in claim 9, further comprising the step of:

displaying the message on the display.

11. The method as recited in claim 10, wherein the retrieving and sending steps are performed in response to receipt of an incoming call to the system intended for the analog telephone extension.

12. The method as recited in claim 11, wherein the sending step includes a step of ringing the analog telephone extension in response to the receipt of the incoming call.

13. The method as recited in claim 12, wherein the incoming call is received from a public switched telephone network coupled to the system.

14. A method comprising the steps of:

formulating a message that does not include one or both of a phone number and an identity of a calling party; and transmitting between first and second caller ID modems the message.

15. The method as recited in claim 14, wherein the transmitting step further comprises the steps of:

retrieving the message by the first caller ID modem;

in the first caller ID modem, converting the message into tones;

transmitting the tones to the second caller ID modem; and in the second caller ID modem, converting the tones back into the message.

16. The method as recited in claim 15, further comprising the steps of:

delivering the message from the second caller ID modem to a display circuit in a telephone unit; and displaying the message.

17. The method as recited in claim 16, wherein the transmitting step is performed in response to receipt of an incoming call intended for the telephone unit, and wherein the transmitting step is performed in conjunction with connecting the incoming call to the telephone unit.

18. A telephone call and voice processing system comprising:

circuitry adaptable for coupling the system to an analog telephone extension, wherein the analog telephone extension includes a display operable for displaying alphanumeric information, and wherein the analog telephone extension includes a first caller ID modem;

circuitry for creating and storing a message associated with the analog telephone extension;

a second caller ID modem coupled to the circuitry adaptable for coupling the system to the analog telephone extension;

circuitry for retrieving the message from the storing circuitry and sending the message to the second caller ID modem;

circuitry for sending the message from the second caller ID modem to the first caller ID modem; and circuitry for displaying the message on the display, wherein the message does not include either a phone number or an identity of a calling party.

19. In a telephone call and voice processing system, a method comprising the steps of:

creating and storing a message associated with an analog telephone extension coupled to the system, wherein the analog telephone extension includes a display operable for displaying alphanumeric information, and wherein the analog telephone extension includes a first caller ID modem;

sending the message to a second caller ID modem in said system; and sending the message from the second caller ID modem to the first caller ID modem, wherein the message does not include either a phone number or an identity of a calling party.

* * * * *